March 27, 1956
H. SCHMITT
2,739,687
ROCKING-LEVER BEARING ELEMENT FOR KEY-OPERATED OFFICE MACHINES
Filed June 25, 1952
2 Sheets-Sheet 1
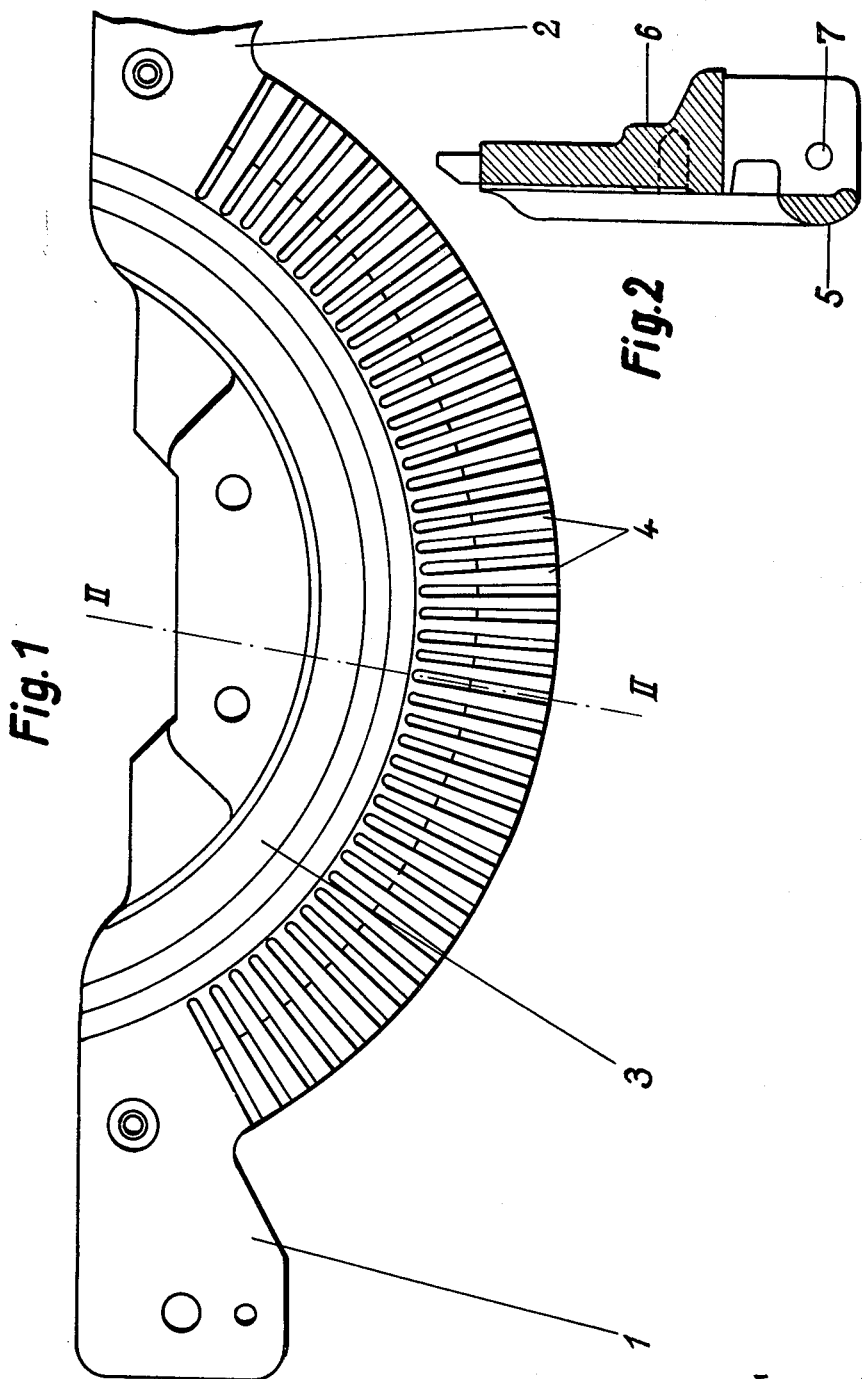
Inventor:
Heinrich Schmitt
By F. D. Rv̄ɡ̄
Att'y

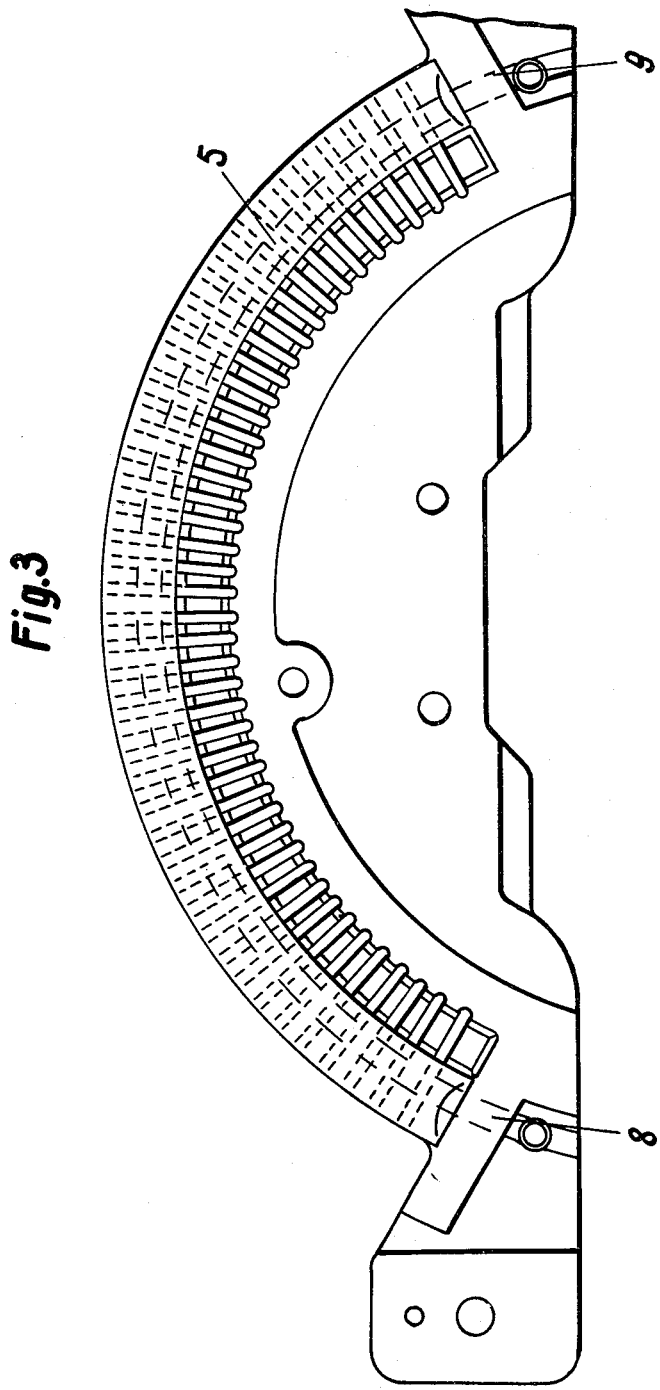

United States Patent Office 2,739,687
Patented Mar. 27, 1956

2,739,687

ROCKING-LEVER BEARING ELEMENT FOR KEY-OPERATED OFFICE MACHINES

Heinrich Schmitt, Frankfurt am Main, Germany, assignor to Rudolph Wittich, Frankfurt am Main, Germany Application June 25, 1952, Serial No. 295,489

Claims priority, application Germany July 11, 1951

3 Claims. (Cl. 197—41)

This invention provides an improved rocking-lever bearing element for key-operated office machinery made in one piece of plastic moulding compound and specifically completed in a single operation, without subsequent cutting or other working, for direct assembly in an office machine.

A rocking-lever bearing element in accordance with the invention is characterized by a high degree of dimensional accuracy and a form of construction such that all elements necessary to support the rocking levers or type bars as well as all stops necessary for limiting the motion of the type bars are integral with the body of the bearing and suitable reinforcements are provided to increase the resistance and mechanical strength of the highly-stressed bearing in such manner that despite the substitution of a metallic material by a plastic, the life of the part is increased.

Type lever bearings of most varied forms and constructions, principally of metal but in some cases of plastic, are of course already known. Hitherto there has not been a plastic rocking lever bearing element which exhibits all required reinforcements, guides, bearing surfaces, stops, and so on integral with the same and produced in a single manufacturing operation so as to enable the element to be assembled in the machine in a finished state without supplementary finishing and without the attachment of any additional metal or other components or parts.

By the present invention a type-lever or rocking lever bearing is obtained of the highest accuracy, fulfilling all requirements, and distinguished as well by the use of a cheap starting material, low production costs and equally short production time.

The mechanical strength of the bearing element is assured in that the guides between which the type or rocking levers move are interconnected in impact reaction damping or distributing manner. By this arrangement, reliable guiding of the levers and high mechanical endurance of the individual guides is attained.

The accompanying drawing shows one arrangement of a rocking-lever or type lever bearing element in accordance with the invention.

Fig. 1 is a plan view of the upper side of the type-lever bearing element.

Fig. 2 represents a cross-section in the plane II—II of Fig. 1.

Fig. 3 is a plan view of the underside of a type-lever bearing element.

The drawing shows a moulded type-lever or rocking lever bearing element or segment having two attachment lugs 1 and 2, enclosing between them a rigid base plate 3 forming a common base for a series of outwardly extending, integral guides 4. Between each two of these guides a slot, with mutually-parallel side surfaces transverse of plate 3, is left for guiding the individual type levers, the guides tapering towards their root ends.

As is particularly clear from Fig. 2, the guides 4 are interconnected on one side at their wide ends by a bridge-piece 5. This bridge 5 is moulded integrally with the rest of the type-lever bearing element in a single operation so that the arrangement of such a bridge involves no additional production or finishing costs or time. In the complete assembly, in which the bearing element is fitted in an inclined position, the bridge-piece 5 is located on the underside of the bearing. An upper segment surface 6, radially inwards of the guides 4, serves as a stop for limiting the swing of the type-levers and is likewise integral with the whole bearing element, being ready for use on completion of moulding without the attachment of a further stop surface or additional finishing. The common rod or spindle for the type levers is fitted in a bore 7 (Fig. 2) the position of which is so selected as to be in the mechanically-strongest part of the bearing element, nearer to the reinforcing bridge 5 than to the upper edges of the individual guides 4. This position has the further advantage that the motion of the type lever between two adjacent guides is controlled by relatively large guide surfaces.

Beyond the outermost guides 4 the bearing element is preferably undercut or tapered sufficiently to expose half the diameter of the bore as indicated at 8 and 9 by broken lines. This facilitates the introduction and fitting of the bearing rod and affords means for its attachment.

I claim:

1. A type lever bearing and stop unit for a key-operated business machine such as a typewriter, comprising a substantially segment-shaped base plate; an arcuate series of lever guides extending outwardly from said plate to generally free outer ends, said guides being separated from one another by radial slots having mutually parallel side surfaces transverse of the plate; an arcuate bridge extending across said slots and interconnecting portions of said outer ends remotely from said base plate; an arcuate series of holes for type lever bearing rod means being formed, one through each of said guides, adjacent said bridge; and an arcuate impact strip forming an integral part of one side of said plate, inwards from said guides, for directly impacting thereon type levers pivoted on said bearing rod means; the entire unit and the plate, guides, bridge and strip thereof being integrally formed of plastic-molded, impact and flexure resisting material.

2. A type lever bearing and stop unit as described in claim 1 wherein said arcuate bridge interconnects portions of said outer ends upon a side of said unit opposite said impact strip.

3. A type lever bearing and stop unit as described in claim 1 wherein said holes for type lever bearing rod means are formed through portions of said guides located inward of at least a portion of said bridge.

References Cited in the file of this patent

UNITED STATES PATENTS

| | | |
|---|---|---|
| 1,072,191 | Stern | Sept. 2, 1913 |
| 2,297,420 | Kruger | Sept. 29, 1942 |